United States Patent [19]

Blickensderfer et al.

[11] 4,098,956
[45] Jul. 4, 1978

[54] SPECTRALLY SELECTIVE SOLAR ABSORBERS

[75] Inventors: Robert Blickensderfer, Albany; Donald K. Deardorff; Russell L. Lincoln, both of Corvallis, all of Oreg.

[73] Assignee: The United States of America as represented by the Secretary of the Interior, Washington, D.C.

[21] Appl. No.: 713,452

[22] Filed: Aug. 11, 1976

[51] Int. Cl.$^2$ .......................... B32B 15/04; F24J 3/02
[52] U.S. Cl. ...................................... 428/627; 126/270; 126/271; 204/192 P; 428/432; 428/450; 428/469; 428/632; 428/633; 428/661; 428/926
[58] Field of Search ............... 428/632, 633, 627, 687, 428/661, 432, 433, 450, 434, 469, 336, 926; 204/192 P; 136/89 PC, 89 CC; 126/270, 271

[56] References Cited

U.S. PATENT DOCUMENTS

| 3,650,737 | 3/1972 | Maissel et al. | 204/192 |
|---|---|---|---|
| 3,920,413 | 11/1975 | Lowery | 126/270 |
| 3,953,178 | 4/1976 | Engel | 428/627 |
| 3,978,272 | 8/1976 | Donley | 126/270 |

OTHER PUBLICATIONS

"Transparent Heat-Mirror Films of $TiO_2/Ag/TiO_2$ for Solar Energy Collection and Radiation Insulation"; Fam et al., App. Phys. Lett., vol. 25, No. 12, 12/74, pp. 693-695.

"Sputtered Metal Carbide Solar-Selective Absorbing Surfaces"; Harding, J. Voc. Sci. Tech., vol. 13, No. 5, 9-10 1976, pp. 1070-1072.

*Primary Examiner*—Arthur J. Steiner
*Attorney, Agent, or Firm*—William S. Brown; Donald A. Gardiner

[57] ABSTRACT

Thin film absorber stacks consisting of an absorptive film of titanium, zirconium or hafnium suboxide, subcarbide or subnitride superposed on a reflective film of silver, aluminum or copper display spectrally selective characteristics. The absorptive film may be prepared by reactively sputtering the metal or the metal carbide in argon or other inert gas with small amounts of gas containing carbon, oxygen or nitrogen or their combinations, or by reaction of the metal film in air or other gas.

7 Claims, 3 Drawing Figures

SPECTRALLY SELECTIVE SOLAR ABSORBERS

BACKGROUND OF THE INVENTION

This invention pertains to the use of plural, superposed, different coatings on a substrate material to efficiently absorb solar radiation while suppressing thermal reradiation.

Efficient conversion of solar radiation into heat energy requires an absorber having a surface which absorbs much of the incident solar energy while losing very little heat by re-radiation. The absorber must also function for long periods exposed to the environment without degradation. An ideal absorber has properties such that it absorbs essentially all radiant energy having a wavelength less than about 2 μm and emits no radiation having a longer wavelength. No one known material even approaches these requirements.

Composite absorbers consisting of multiple layers of different materials have been developed and are known as absorber stacks. These stacks typically consist of an outer absorbing layer and an inner reflective layer. In operation, solar radiation is absorbed by the outer layer and is converted into heat energy. The heat energy is conducted through the inner reflective layer into an appropriate working medium. Very little heat is lost from the absorber because it is essentially transparent to longwave thermal radiation and therefore cannot emit. Radiation of heat energy from the working medium is blocked by the reflective inner layer.

Absorber stacks having a variety of compositions have been reported. Hottel and Unger prepared absorber stacks by spraying cupric oxide on bright aluminum. This work was published as Hottel et al, The Properties of a Copper Oxide - Aluminum Black Surface Absorber of Solar Energy, Solar Energy, 3.3, 1959. Kokoropoulos et al, Selective Radiation Coatings: Preparation and High Temperature Stability, *Solar Energy*, 3:4, 1959, applied coatings of CuO and $Co_3O_4$ on polished nickel, silver and platinum. Lowery, Selective Coatings for Collecting Solar Energy on Aluminum, *NASA Tech. Brief* 73-10527, Marshall Space Flight Center, 21 pp., April 1974, electrodeposited bright nickel and nickel black onto anodized aluminum. A summary of the application of thin film coatings in solar-thermal power systems was recently published as: Peterson et al, Thin Film Coatings in Solar-Thermal Power Systems, *J. Vac. Sci. Technol.*, 12:1, 1975. Finally, Lowery in U.S. Pat. No. 3,920,413, discloses use of a layer of zinc interposed between an aluminum substrate and a reflective layer of bright nickel.

SUMMARY OF THE INVENTION

Certain transition metal compounds applied as a film or coating on a substrate display spectrally selective characteristics when used as a solar absorber. Suboxides, nitrides and carbides of titanium, zirconium and hafnium and combinations of these materials applied as a thin film over a reflector metal, such as gold, copper, silver or aluminum display solar absorptance to emittance ratios as high as 28. The films may be deposited by reactive sputtering techniques or a film of the transition metal may be deposited by any convenient technique and thereafter subjected to a chemical reaction to form the desired compound.

Accordingly, it is a general object of this invention to provide means for selectively absorbing solar energy.

It is also an object of this invention to provide a method for preparing absorber stacks displaying high solar absorptance to emittance ratios.

DETAILED DESCRIPTION OF THE INVENTION

Figure 1:
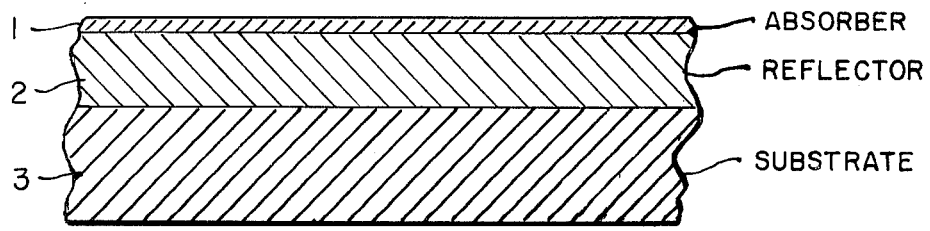
FIG. 1 is a sectional view of an absorber stack constructed in accordance with this invention.

The absorber stacks of this invention conform in general arrangement to those of the prior art. As is shown in FIG. 1, the stack consists of a first layer or coating of a solar energy absorbing compound superposed on a reflective layer 2. These layers are placed or mounted upon a substrate material 3 which ordinarily confines a heat exchange medium.

Layer 1 consists of a transition metal compound which displays high absorptance over the solar radiation spectrum but is substantially transparent at longer wavelengths. Composition of the absorber film making up layer 1 must conform to the following formula:

$$MC_xO_yN_z$$

where M is titanium, zirconium or hafnium and where the sum of $x+y+z$ is less than 2 but greater than 0. Particularly preferred compositions are the suboxides and subnitrides of zirconium. Thickness of the absorbing film may range from about 800 to about 5000 Angstroms. Best results have been obtained with film thicknesses ranging from about 800 to about 2400 Angstroms.

Reflective layer 2 consists of a mirror-like film of any metal which displays high reflectance in the infrared spectrum. Copper, silver, aluminum, gold, beryllium, molybdenum, or tungsten are all suitable for this use. Substrate 3 serves as a support for the reflective and absorptive films and to confine a heat transfer medium. Metals such as stainless steel, copper or aluminum and non-metals such as glass or ceramics are suitable for use as the substrate.

In operation, layer 1 of the absorber stack is exposed to solar radiation. As is shown by curve 4 of FIG. 2, substantially all of the solar radiation occurs between wavelengths of 0.3 and 1.8 μm. Re-radiation at longer wavelenths is very much dependent upon temperature as is illustrated by curves 5 and 6 of FIG. 2. Even at relatively high temperatures, there is very little re-radiation at wavelengths shorter than about 2 μm. The absorbing film layer 1 converts solar radiation into heat which is then conducted through reflective layer 2 and into substrate 3. Re-radiation from substrate 3 is precluded by the reflective characteristics of layer 2. Even though layer 1 is at the same or slightly higher temperature than is substrate 3, it does not re-radiate because it is substantially transparent to the longer wavelengths.

Figure 2:
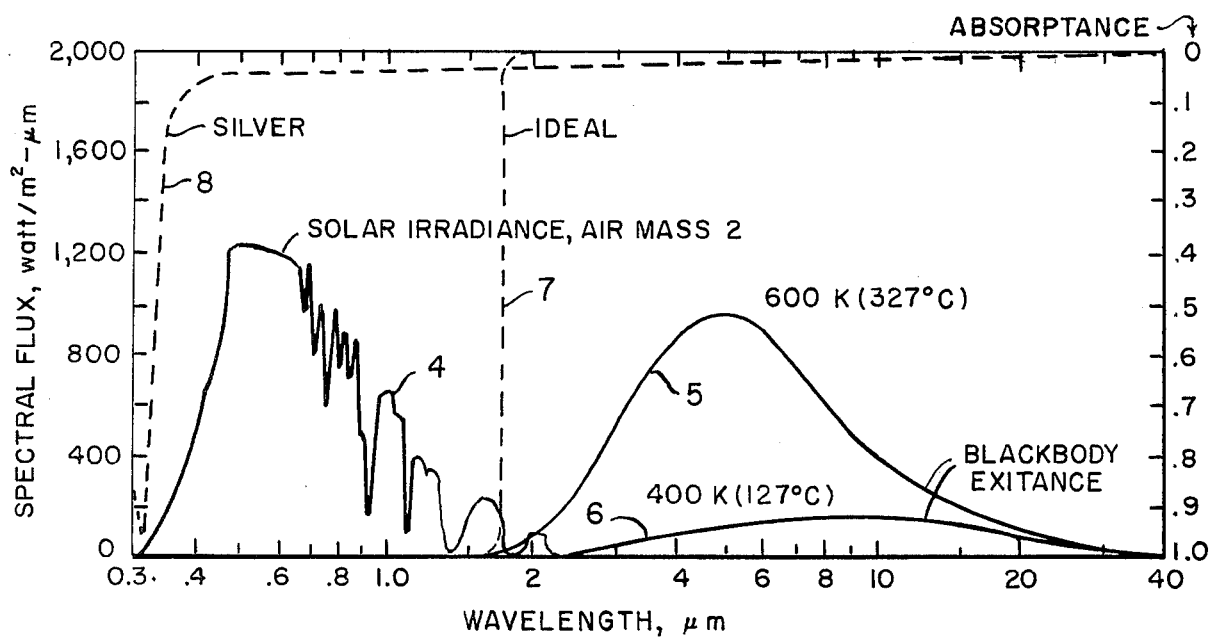
FIG. 2 is a plot of spectral flux and a blackbody exitance versus wavelength. Also shown are the absorptance characteristics of silver and of an ideal absorber plotted against wavelength.
Figure 3:
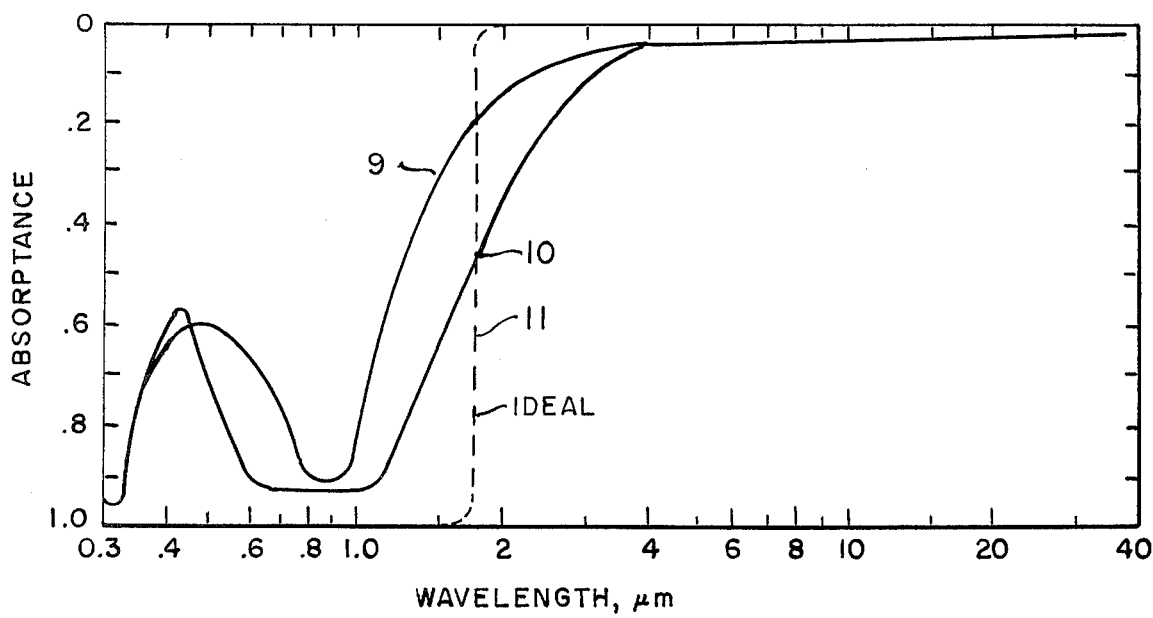
FIG. 3 illustrates the normal spectral reflectance of absorber stacks prepared in accordance with this invention.

An ideal solar absorber would have the absorptance characteristics shown in curve 7 of FIG. 2. A reflective metal layer has very low absorptance over the entire solar and infrared spectrum as is shown by the absorptance curve 8 for silver. By depositing a film or layer of an absorptive material overtop a reflective metal layer, there is achieved a composite material, or absorber stack, displaying absorptance characteristics illustrated by curves 9 and 10 of FIG. 3. Curve 9 illustrates the absorptive properties of an 800 Angstrom layer of oxidized zirconium superposed on a silver reflective layer carried upon a glass substrate. Curve 10 illustrates the absorptive properties of a 1600 Angstrom layer of $ZrN_z$ superposed on a silver reflective layer carried upon a stainless steel substrate. Curve 11 again represents the absorptance properties of an ideal solar absorber.

The absorptive materials of this invention may most conveniently be deposited by means of sputtering. Sputtering is a well known technique commonly used to deposite metal films by means of an electric discharge in which positive gas ions bombard a metallic cathode causing ejection of atoms from the cathode. These ejected metal atoms are allowed to strike a substrate where they form a coating. The reflective film may also be deposited by sputtering although other techniques such as electroplating may be used as well.

A general procedure for fabricating the absorber stacks of this invention is as follows. The substrate material must be cleaned so as to insure adhesion of the reflective layer. Substrates may be ultrasonically cleaned in a detergent solution and thereafter rinsed in deionized water. Thin films comprising the absorber stacks may then be deposited by RF sputtering in commercially available equipment. Preferably the deposition procedure is begun by sputter-etch cleaning the substrate surface for about 10 minutes. When stainless steel or similar substrates are used, a film of the transition metal, about 250 Angstroms thick, is first deposited on the substrate. Alternatively, a very thin oxide film on the substrate may be used. Such a film can be prepared on steel, for example, by oxidizing it for 4 minutes in air at a temperature of 300° C. This improves the bonding of the reflective metal film, usually silver or copper, which is deposited next. A reflective film thickness of about 1500 Angstroms is generally appropriate. When a glass or ceramic substrate is used, the reflective film may be deposited directly on the substrate.

Metal suboxide-nitride films may be produced in two different ways. In the first technique, the transition metal is deposited onto the reflective film. Thereafter, the transition metal film is reacted by heating to moderately elevated temperatures in the presence of a gas such as air. Suboxide or subnitride films may also be produced by reactive sputtering. In reactive sputtering, a chemically reactive gas such as nitrogen, oxygen or air, is added to the inert gas, usually argon, within the reaction chamber. As the sputtering process proceeds, chemical reaction takes place between the transition metal and the reactive gas to produce a suboxide or subnitride of the transition metal. Extent of the reaction can be controlled by adjusting the partial pressure of the reactive gas within the chamber. The carbide of the transition metal may be used in substitution for the pure metal to produce metal carbide or metal-carbide-oxide-nitride films by either of the two aforementioned ways. Operating parameters which give good results include an energy level of 1 W/cm² of target (cathode) area at 1000 V, 5 cm cathode-to-substrate spacing and 15 mTorr argon pressure. At these conditions, the deposition rate for zirconium is about 160 Angstroms per minute with somewhat lower rates for reactive sputtering.

Specific examples illustrating certain embodiments of the invention are set out below.

EXAMPLE 1

A silver reflective film was deposited onto a glass substrate by sputtering. Thereafter, a zirconium metal film having a thickness of approximately 800 Angstroms was sputtered atop the silver layer. The composite material was then heated in air at 300° C for 30 minutes. Scanning spectrophotometers were used to measure the normal spectral reflectance at room temperature using aluminum mirrors as reference standards. Measured reflectance values were corrected for the reflectance of aluminum and for instrument deviation as determined by scanning a calibrated standard.

Solar absorptance, thermal emittance and the ratio of solar absorptance to thermal emittance were calculated. These values were obtained by numerical integration of the reflectance curves obtained at room temperature over the solar distribution curve 4 and the 600° K distribution curve 6, of FIG. 2. Solar absorptance was found to be 0.73; thermal emittance at 600K was 0.029 and the ratio of the two values was 25. These data are also presented in graphical form as curve 9 of FIG. 3.

EXAMPLE 2

A thin film of zirconium was sputter coated on a stainless steel substrate and a silver reflective film was then sputtered atop the zirconium. Thereafter a film of $ZrN_z$ approximately 1800 Angstroms thick was reactively sputtered onto the silver coating using a nitrogen partial pressure of 0.12 mTorr.

Spectral properties of the absorber stack were determined as in Example 1. Solar absorptance was found to be 0.85; thermal emittance at 600K was 0.035 and the ratio of the two values was 24. These data are also presented in graphical form as curve 10 of FIG. 3.

EXAMPLE 3

A thin film of titanium was sputter coated on a stainless steel substrate and a silver reflective film was then sputtered atop the titanium. Thereafter a film of $TiN_z$ approximately 1600 Angstroms thick was reactively sputtered onto the silver coating using a nitrogen partial pressure of 0.10 mTorr.

Spectral properties of the absorber stack were determined as in Example 1. Solar absorptance was found to be 0.88; thermal emittance at 600 K was 0.065 and the ratio of the two values was 14.

EXAMPLE 4

A silver reflective film was sputtered onto a glass substrate. Thereafter a film of ZrC approximately 1600 Angstroms thick was sputtered overtop the silver film.

Spectral properties of the absorber stack were determined as in Example 1. Solar absorptance was found to be 0.81; thermal emittance at 600 K was 0.072 and the ratio of the two values was 11.

EXAMPLE 5

A silver reflective film was sputtered onto a glass substrate. Thereafter a film of $ZrO_yN_z$ approximately 2400 Angstroms thick was reactively sputtered overtop the silver film using an air partial pressure of 0.10 mTorr.

Spectral properties of the absorber stack were determined as in Example 1. Solar absorptance was found to be 0.66; thermal emittance at 600K was 0.047 and the ratio of the two values was 14.

EXAMPLE 6

An aluminum reflective film was sputtered onto an oxidized stainless steel substrate. Thereafter a film of $ZrC_xN_z$ approximately 1600 Angstroms thick was reactively sputtered overtop the aluminum film. A zirconium carbide cathode was used and the nitrogen partial pressure was 0.08 mTorr.

Spectral properties of the absorber stack were determined as in Example 1. Solar absorptance was found to be 0.85; thermal emittance at 600 K was 0.074 and the ratio of the two values was 11.

EXAMPLE 7

A specimen prepared as in Example 6 was heated in vacuum for a period of 15 hours at successive temperatures of 375°, 405°, 450°, 500°, 550°, and 600° C to determine the stability of the absorber stack.

Spectral properties of the absorber stack were determined as in Example 1. At the conclusion of the above heating periods, solar absorptance was found to be 0.88; thermal emittance at 600 K was 0.040 and the ratio of the two values was 22.

EXAMPLE 8

A series of absorber stacks having an absorbing layer comprising $ZrN_z$ were fabricated. In all instances, the absorbing layer was approximately 3200 Angstroms thick and was sputter deposited upon a silver reflective coating. Values of $z$ were varied over the range of 0 to 1 by adjusting the partial pressure of nitrogen within the chamber during sputtering. It was found that as $z$ approached 0, the properties of the absorptive film approached that of zirconium metal, reflecting a substantial portion of incident energy over the solar spectrum and reflecting less than silver in the infrared spectrum.

As the value of $z$ approached 1, the absorptive film became increasingly transparent in the infrared spectrum, as required, but became too transparent in the shortwave region to be a good absorber.

A similar series of tests were run in which the value of $y$ in $ZrO_y$ was varied over the same range. Again, as with $ZrN_z$, as $y$ approached 0, the properties of the absorptive film approached those of metallic zirconium. As $y$ approached 2, transparency of the absorptive film increased over both the shortwave and infrared portions of the spectrum.

We claim:

1. An absorber stack consisting of a substrate having coated thereon a reflective metal film and having a solar energy absorptive film superposed upon said reflective metal film; said reflective metal film having a thickness of about 1500 Angstroms and consisting of a metal selected from the group consisting of gold, copper, silver, aluminum, beryllium, molybdenum and tungsten, and said absorptive film having a thickness of about 800 to 2400 Angstroms and consisting of a compound of the formula $MC_xO_yN_z$ wherein M is selected from the group consisting of titanium, zirconium and hafnium and mixtures thereof and wherein the sum of $x+y+z$ is greater than 0 but less than 2.

2. The absorber stack of claim 1 wherein the value of $x$ is 0.

3. The absorber stack of claim 1 wherein the value of $y$ is 0.

4. The absorber stack of claim 1 wherein the value of $z$ is 0.

5. The absorber stack of claim 1 wherein the values of both $x$ and $y$ are 0.

6. The absorber stack of claim 1 wherein the values of both $x$ and $z$ are 0.

7. The absorber stack of claim 1 wherein the values of both $y$ and $z$ are 0.

* * * * *